(No Model.)
E. J. DE SMEDT.
ARTIFICIAL PAVEMENT.
No. 375,273. Patented Dec. 20, 1887.
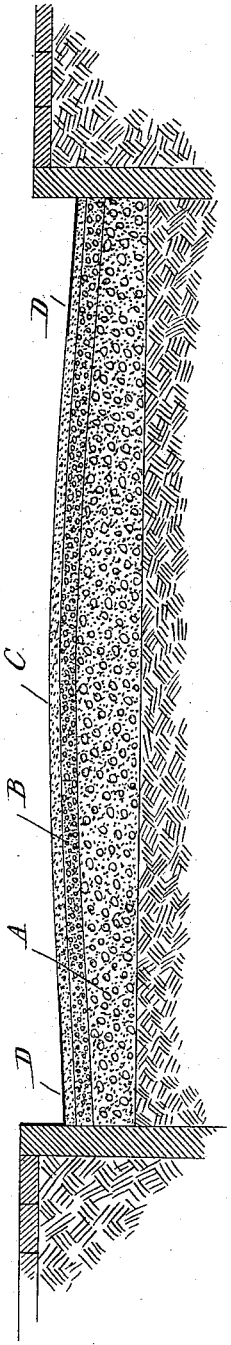
Witnesses
Edwin L. Yewell
Chas. Helm
Inventor
Edward J. De Smedt.
By his Attorney
L. W. Sinsabaugh.

UNITED STATES PATENT OFFICE.

EDWARD J. DE SMEDT, OF WASHINGTON, DISTRICT OF COLUMBIA.

ARTIFICIAL PAVEMENT.

SPECIFICATION forming part of Letters Patent No. 375,273, dated December 20, 1887.

Application filed January 25, 1887. Serial No. 225,481. (No model.)

*To all whom it may concern:*

Be it known that I, EDWARD J. DE SMEDT, a citizen of the United States, residing at Washington, in the District of Columbia, have invented certain new and useful Improvements in Concrete Pavements, of which the following is a specification, reference being had therein to the accompanying drawing.

My invention relates to certain improvements in concrete pavements.

The object of my invention is to thoroughly lock or cement the different layers or stratas of which the pavement is composed, more especially to form a bond of union between the upper or wearing course and the intermediate or binding course, so that there will be less liability to crack and disintegrate under the influences of heat, cold, or moisture.

In the drawing I have shown a transverse sectional view of a pavement laid according to my invention.

In carrying out my invention the road-bed is graded to the proper depth, upon which is placed a layer of cement concrete, A, said concrete being made of Portland or other good hydraulic cement, clean sharp sand, and broken stone, brick, or gravel, and laid to the depth of three or more inches, the thickness of this layer being dependent on the probable traffic of the road or street to be paved. The proportions of ingredients used in this concrete base may be varied; but I prefer to use them in the following proportions: One measure of hydraulic cement and two measures of clean sharp sand, free from clay or other extraneous matter, is mixed with a suitable amount of water to form a mortar. Broken stone, or hard broken brick or gravel of the proper size, either separate or combined, is soaked or saturated with water, and while in this saturated condition is mixed with the mortar above described, the quantity of broken stone being such as will give a surplus of mortar when the concrete is rammed down on the road-bed. The mixing of the broken stone with the mortar may be done by hand or with suitable machinery, such mixing being carried on until each piece of broken stone or other material used is completely coated or covered with the mortar. The cement concrete thus formed is then spread at once on the previously-prepared road-bed and thoroughly compacted by ramming until the free mortar appears upon the surface. The upper surface of this layer or bed of concrete is finished with a smooth surface and so shaped as to correspond to the curvature of the crown or upper surface of the pavement. When this foundation layer or course of hydraulic concrete has set or become sufficiently hard, I place thereon the cementing or locking course B, which is composed of the following materials: Broken stone about one inch in largest diameter is thoroughly screened in order to free it from dust, is heated by passing the same through revolving heaters, and while in this heated condition is mixed, by means of machinery or otherwise, with the residuum of coal-tar distillate, which is known in the trade as "No. 4," or any other number, or with coal-tar products and asphaltum and petroleum-oil combined, until each stone is perfectly and evenly coated with the bituminous matter, care being exercised in order to avoid a surplus of the bituminous material. About one-half gallon of the coal-tar product is used for each cubic foot of broken stone, this amount being sufficient to firmly bind the broken stone together without having a surplus of the bituminous material to run down and fill the voids between the broken stone.

Instead of using broken stone, I may use gravel and sand mixed together, or a combination of broken stone, gravel, and sand, when the same is coated with the bituminous compound. A layer of suitable thickness of the broken stone thus prepared is laid on the hydraulic concrete base A and rolled or compacted in any suitable manner, so as to form a substantial bed for the top or wearing course, C.

The top or wearing course, C, is composed of refined Trinidad or other suitable asphaltum, heavy petroleum, or the residuum of petroleum, fine sand, and powdered carbonate of lime, mineral dust, or any other finely-divided mineral material.

The proportions of the above-mentioned substances will depend upon the character and the traffic of the street, and in some cases the carbonate of lime or mineral dust may be omitted. This will depend on the quality of the sand.

In order to protect the sides of the pavement from the deteriorating effects of moisture and the urine of animals, I coat the same with coal-tar cement or other resinous pitch, which is ironed in and smoothed down with hot smoothing-irons on and into the surface or wearing course C. This strip of coal-tar is shown at D and extends outward from the curb a distance of about two feet, more or less, and when laid as described effectually protects the gutters from rapid disintegration.

The advantage of a pavement laid in the manner described is that the bituminous matter employed in cementing the broken stone of the middle or binding course, B, will cause the wearing surface or top layer, C, to adhere, thus forming a solid or comparatively solid mass, which increases the strength of the pavement and at the same time will be pliable enough to prevent the cracking of the surface layer.

What I claim is—

1. A concrete pavement consisting of a base of hydraulic concrete, an intermediate or binding course of broken stone coated with bituminous material, and a top or wearing surface of bituminous concrete, as described.

2. A concrete pavement consisting of a base of hydraulic concrete, an intermediate or binding course of broken stone coated with bituminous material, and a top or wearing surface of asphaltic concrete.

In testimony whereof I affix my signature in presence of two witnesses.

EDWARD J. DE SMEDT.

Witnesses:
EDWIN L. YEWELL,
S. SINSABAUGH.